June 19, 1956   J. R. STIRNKORB   2,751,544
DOSIMETER CHARGER
Filed July 23, 1954   2 Sheets-Sheet 1
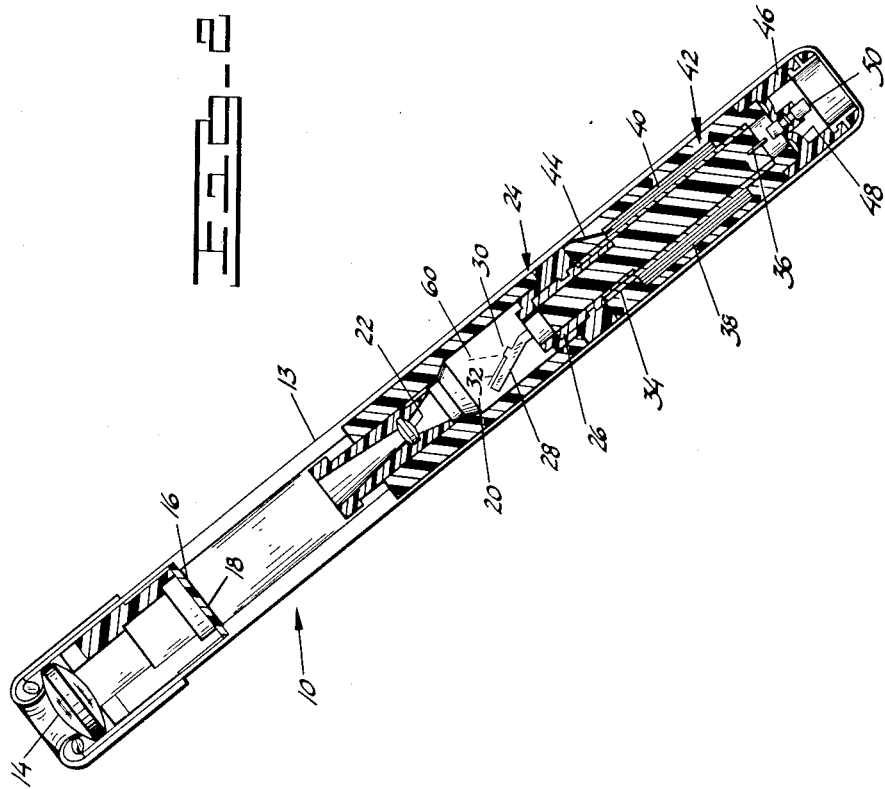
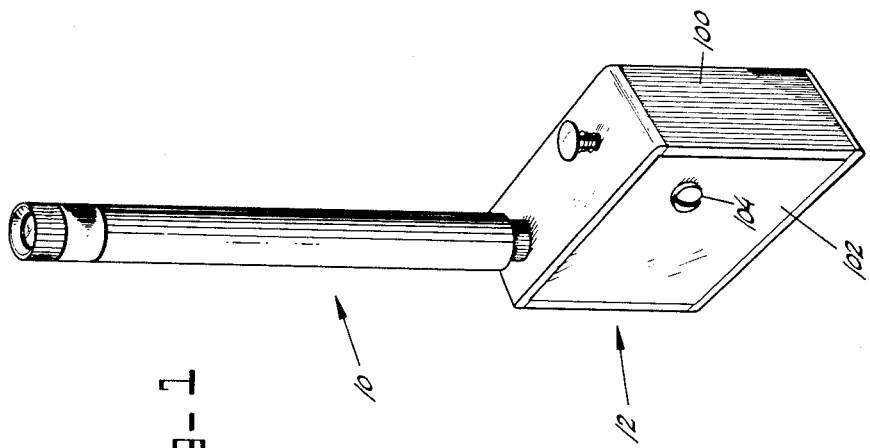
INVENTOR.
JOHN R. STIRNKORB
BY
ATTORNEY June 19, 1956  J. R. STIRNKORB  2,751,544
DOSIMETER CHARGER
Filed July 23, 1954  2 Sheets-Sheet 2
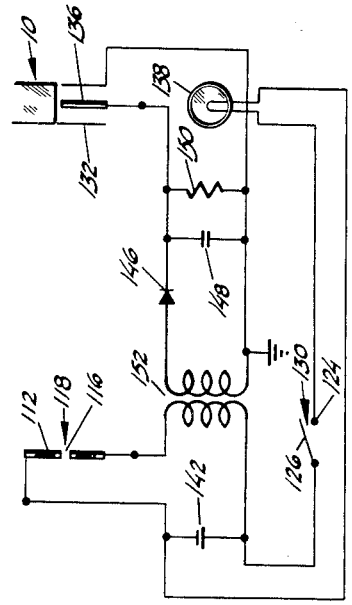
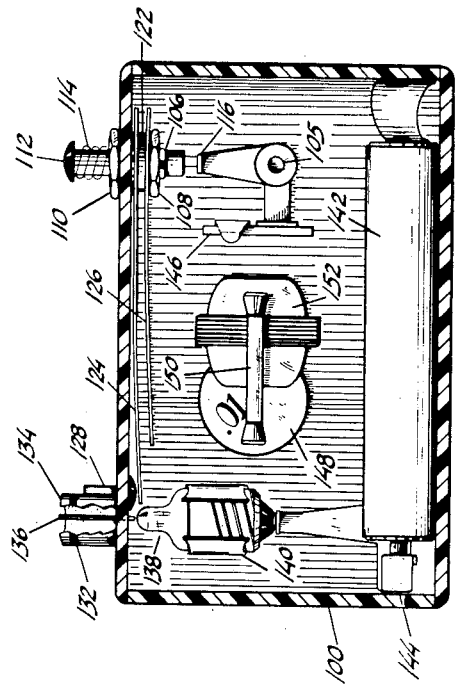
INVENTOR.
JOHN R. STIRNKORB
BY
ATTORNEY

United States Patent Office 2,751,544
Patented June 19, 1956

2,751,544
DOSIMETER CHARGER

John R. Stirnkorb, Dillonville, Ohio, assignor to Bendix Aviation Corporation, Detroit, Mich., a corporation of Delaware Application July 23, 1954, Serial No. 445,230

11 Claims. (Cl. 320—1)

This invention relates to energy providers and more particularly to apparatus for providing electrical energy to such instruments as dosimeters for subsequent use by the dosimeters.

In recent years, certain instruments known as dosimeters have been developed for use in the measurement of exposure to electromagnetic radiation. Most dosimeters are small enough to be carried in or on the clothing of an individual to provide an indication as to whether or not the individual has been exposed to excessive amounts of radiation. Some dosimeters employ an electrometer to measure the cumulative amount of radiation to which the dosimeter has been exposed. Before such an instrument is placed into use, the electrometer is charged to a maximum value to indicate a reading of zero radioactivity on a scale provided in the instrument.

When the dosimeter is exposed to radiation, the electrometer begins to discharge because of the effects of the radiation. The extent to which the electrometer is discharged provides a measure of the amount of radiation to which the dosimeter and the person carrying the dosimeter have been subjected. After an electrometer-type dosimeter has been sufficiently discharged from radioactivity or from leakage of the charge because of a long period of non-use, the dosimeter must be charged again to its maximum value so that it can be utilized once again to measure radioactivity. For this reason, it is necessary to provide apparatus for charging the dosimeters.

Preferably, such apparatus should include a minimum number of components so that it will be relatively inexpensive to produce and should be relatively light and compact so that it will be highly portable. For example, the dosimeter should desirably be small enough to be carried in the pocket of a man's suit. Furthermore, such apparatus should be so constructed that it can be used in combination with a dosimeter to charge the dosimeter with a minimum amount of effort by an operator and with a minimum amount of confusion to inexperienced people. Heretofore, no entirely satisfactory apparatus has been developed.

This invention provides apparatus for operating in a reliable manner to charge a dosimeter so that the dosimeter can subsequently give proper indications of radioactivity. The apparatus includes a charging circuit which is contained within a housing. The charging circuit is normally open to prevent a capacitance forming a part of the circuit from being charged. A first switch mounted externally of the housing is adapted to be manually depressed to close the circuit for a charging of the capacitance. A second switch also mounted externally of the housing is constructed and disposed to receive the dosimeter for a discharge of the capacitance through the dosimeter when the switch becomes closed by the application of pressure upon the dosimeter.

An object of this invention is to provide apparatus for charging an instrument such as a dosimeter.

Another object of this invention is to provide apparatus of the above character which is relatively light and compact so that it can be easily carried, especially in such convenient ways as in a pocket of a man's suit.

A further object is to provide apparatus of the above character which can be conveniently and easily operated by one person, even by a person relatively inexperienced in such matters as the principles of atomic energy and relatively uninstructed in the operation of the apparatus itself.

Still another object is to provide apparatus of the above character which is capable of operating for long periods of time without any necessary adjustment in calibration or replacement of parts.

A still further object is to provide apparatus of the above character which is relatively inexpensive.

Other objects and advantages will be apparent from a detailed description of the invention and from the appended drawings and claims.

In the drawings:

Figure 1 is a perspective view illustrating the operative relationship between a dosimeter and apparatus which constitutes one embodiment of this invention and which is adapted to charge the dosimeter;

Figure 2 is an enlarged sectional view of the dosimeter shown in Figure 1 and illustrates the dosimeter in some detail;

Figure 3 is an enlarged side elevational view of the charging apparatus shown in Figure 1, with the side cover removed to clearly show the interior components; and Figure 4 is a somewhat simplified circuit diagram of the electrical features forming a part of the charging apparatus shown in Figures 1 and 3.

In one embodiment of the invention, a dosimeter generally indicated at 10 is adapted to be mounted upon charging apparatus generally indicated at 12. The dosimeter 10 is provided with a housing 13 (Figure 2) made from a suitable conductive material, such as aluminum. Retained at the forward end of the housing 13 is a double-convex eyepiece 14 and a disc 16 which is provided with a scale 18 to indicate the amount of radiation to which a person carrying the dosimeter 10 has been exposed.

An ionization chamber 20 is provided at an intermediate position within the housing 13. A double-convex lens 22 is disposed at the forward end of the chamber 20. An electrometer assembly, generally indicated at 24, is positioned adjacent the ionization chamber 20. The electrometer 24 includes a cylindrical base 26 made from a suitable conductive material, such as aluminum.

Extending from the base 26 and into the ionization chamber 20 is a substantially U-shaped frame 28. A lug 30 extends upwardly from each of the legs on the U-shaped frame 28 and a substantially U-shaped fiber 32 is retained in notches provided in the lugs. The fiber 32 may be made from a suitable material such as quartz on which a metallic coating such as platinum is sputtered to render it conductive.

The rear portion of the base 26 is snugly retained within a tube 34 made of a suitable conductive material such as aluminum. A cross piece 36 made from a conductive material such as aluminum is positioned across the rear of the tube 34 in slots provided in the tube. Thin layers of aluminum foil 38 and of an insulating material 40 are wound on the tube 34 to form with the tube a capacitance, generally indicated at 42. One end of a tab 44 is retained in contact with an outer layer of the foil 38. The other end of the tab makes contact with the housing 13 to maintain the foil 38 at substantially the ground potential provided by the housing.

A diaphragm 46 is positioned in the housing 13 at the rear of the tube 34. The diaphragm 46 is provided at its forward end with a flexible membrane portion 48 which supports a conductive contact pin 50. The contact pin is separated axially by a relatively small distance from the cross piece 36 in the relaxed position of the membrane portion 48. Upon the imposition of a slight axial force on the contact pin 50, the membrane portion 48 is adapted to flex so as to move the contact pin 50 into engagement with the cross piece 36.

The dosimeter disclosed above may be similar in construction to the dosimeter fully disclosed in co-pending application Serial No. 349,471, filed April 14, 1953, by Byron L. Allison, Jr. et al. To place the dosimeter 10 into operation, the electrometer 24 must first be charged. The electrometer may be charged, for example, by connecting the negative terminal of a direct voltage source, such as a high-voltage power supply (not shown) to the housing 13 and by connecting the positive terminal of the power supply to the contact pin 50. The dosimeter may also be charged by the apparatus shown in Figures 1, 3 and 4 and constituting this invention.

When the pin 50 is pressed into engagement with the cross piece 36, a continuous electrical circuit is established which includes the positive terminal of the power supply, the contact pin 50, the cross piece 36, the tube 34, the capacitance 42, the tab 44, the housing 13 and the negative terminal of the battery. Current then flows through the circuit and causes the capacitance 42 to become charged to substantially the voltage of the power supply, such as 180 volts. Since the fiber 32 and the frame 28 are electrically connected through the base 26 to the tube 34, a voltage difference of approximately 180 volts is produced between these members and the walls of the ionization chamber when the capacitance 42 becomes charged. The positive voltage on the frame 28 and the fiber 32 produces a deflection of the fiber to a position indicated in Figure 2 in broken lines as at 60. When the fiber is at position 60 in Figure 2, the fiber as viewed through the eye-piece 14 is at a position of initial reading on the scale 18, corresponding to a value of "0."

Upon the exposure of the dosimeter to radiation, molecules of air within the ionization chamber 20 are ionized into positive ions and electrons. The electrons are attracted to the frame 28 and the fiber 32 by the positive charge on these members, and the positive ions are attracted to the ionization chamber 20 and the housing 13 because of the ground potential on these members.

The electrons attracted to the frame 28 and the fiber 32 flow to the base 26 and the tube 34 so as to produce a corresponding discharge of the capacitance 42. As the capacitance 42 becomes gradually discharged, the fiber 32 is correspondingly deflected towards the frame 28 to provide an increasing indication on the scale 18. When the voltage on the capacitance has decreased sufficiently, a full scale indication is provided by the scale 18 of the cumulative amount of radiation to which a person may be exposed. When a full scale indication is reached upon the scale 18, the capacitance 42 must be recharged to deflect the fiber 32 to its initial zero position so that the dosimeter may be used again to measure cumulative amounts of radioactivity.

As disclosed previously, apparatus generally indicated at 12 in Figures 1 and 3 may be used to charge instruments such as the dosimeter 10. The charging apparatus 12 may be contained within a small housing 100 made of a suitable material having a relatively light weight. For example, the housing may be approximately 1 inch wide, 2½ inches long and 2 inches high. The housing 100 may have a side cover 102 (Figure 1) which may be easily detached from the housing 100 upon the removal of a screw 104 from a threaded socket 105 (Figure 3). By making the side cover 102 easily detachable, the components within the housing 100 may be readily assembled or replaced, as shown in Figure 3.

The components supported by the housing 100 include a sleeve 106 suitably secured to the top of the housing 100 by a pair of nuts 108 and 110 which are respectively positioned inside and outside of the housing. A push button 112 extends through the sleeve 106 from a position outside of the housing 100 and in slidable relationship to the sleeve. The push button 112 is normally maintained by a spring 114 in slightly displaced relationship from a stationary contact 116, which forms with the button 112 a switch generally indicated at 118 in Figure 4. The spring 114 is positioned between the nut 110 and a flange at the top of the push button 112 so as to become compressed when the button is depressed.

An insulator 122 is supported on the sleeve 106 within the housing 100 and above the nut 108. A first leaf spring 124 is also supported on the sleeve 106 between the housing 100 and the insulator 122, and a second leaf spring 126 is positioned on the sleeve 106 between the insulator 122 and the nut 108. The left end of the spring 124 is positioned directly below a button 128 so as to be depressed into contact with the leaf spring 126 upon a downward movement of the button 128. In this way, the leaf springs 124 and 126 form a switch generally indicated at 130 in Figure 4.

The button 128 is positioned in lateral juxtaposition to an annular socket 132 which extends outwardly from the housing 100 and which may form a part of the housing. The socket 132 has a diameter slightly less than that of the dosimeter housing 13 (Figure 2). A hole is provided in the top of the housing directly below the socket 132. A transparent material 134 such as a polymer of methyl methacrylate fills the socket 132 for reasons which will be disclosed in detail hereafter. A pin 136 extends through the transparent filling 134 to a position above the filling.

A light bulb 138 is supported as by brackets 140 within the housing 100 at a position directly below the transparent filling 134. Similarly, a single dry-cell battery 142 similar to that used in flashlights is supported as by brackets 144 at the bottom of the housing 100. Other components supported within the housing include a suitable rectifier 146 such as a selenium rectifier, a capacitance 148, a resistance 150 having a relatively high value and a transformer 152 having a primary winding and a secondary winding.

The various components shown in Figure 3 are connected in an electrical circuit as shown in Figure 4. Thus, the negative terminal of the battery 142 is electrically connected to the push button 112 forming a part of the switch 118. Connections are made from the stationary contact 116 of the switch 118 and from the positive terminal of the battery 142 to opposite terminals of the primary winding in the transformer 152. The light bulb 138 and the switch 130 formed from the leaf springs 124 and 126 are also in series with the battery 142 and in parallel with the switch 118 and the primary winding of the transformer 152.

The diode rectifier 146 and the capacitance 148 are in series with the secondary winding of the transformer 152, one terminal of the transformer winding and of the capacitance being grounded. The resistance 150 is in parallel with the capacitance 148, and the pin 136 is connected to the ungrounded terminals of the capacitance 148 and the resistance 150.

The switch 118 becomes closed when the push button 112 is manually depressed to engage the contact 116. Upon the closure of the switch 118, a surge of current flows through a circuit including the battery 142, the primary winding of the transformer 152 and the switch 118. This current induces a considerable voltage in the secondary winding of the transformer 152 since the secondary winding has a substantially greater number of turns than the primary winding. For example, a voltage of 30 volts may be induced in the secondary winding of the transformer 152 for a battery voltage of only 2 volts.

The voltage induced in the secondary winding of the transformer 152 produces a flow of current through a circuit including the secondary winding, the rectifier 146 and the capacitance 148. This causes the capacitance to become charged to a substantial value. When the push button 112 is released, the capacitance 148 is prevented from discharging through the secondary winding of the transformer 152 because of the high back resistance of the rectifier 146. The capacitance 148 is also prevented from discharging through the resistance 150 because of the relatively high value of the resistance.

When the dosimeter housing 13 is inserted on the socket 132 as shown in Figure 1, the pin 50 in the dosimeter engages the pin 136 in the charging apparatus. Upon the application of downward pressure on the dosimeter, the membrane portion 48 in the dosimeter flexes and moves the pin 50 into engagement with the cross piece 36. This establishes an electrical circuit including the capacitance 148, the pin 136 in the charging apparatus, the pin 50 in the dosimeter, the cross piece 36, the tube 34, the capacitance 42, the tab 44, the dosimeter housing 13 and the socket 132 in the charging apparatus.

Since the impedance of the circuit established through the capacitance 42 is considerably less than the value of the resistance 150 and since the rectifier 146 prevents the capacitance 148 from discharging through the secondary winding of the transformer, the capacitance 148 discharges through the capacitance 42. This causes the capacitance 42 in the dosimeter to become charged and the fiber 32 to become correspondingly deflected from the frame 28. The deflection of the fiber 32 is easily visible because of the illumination provided by the light bulb 138 through the transparent filling 134 when pressure is imposed on the dosimeter. The bulb 138 becomes lit since the dosimeter housing 13 presses down upon the button 128 and causes the button to move the leaf spring 124 downwardly into engagement with the leaf spring 126. The resultant closure of the switch 130 causes a continuous circuit to be established through the battery 142, the switch and the bulb 138.

By depressing the button 112 a few times to close the switch 118, repeated charges are delivered to the capacitance 148 which in turn gradually charges the dosimeter capacitance 42 so that the fiber 32 will become gradually deflected to a value approximating a zero reading on the scale 18. If the deflection of the fiber 32 becomes too great, the dosimeter can be retained on the sleeve 132 for a short while without depressing the button 112 so that the capacitance 42 can slowly discharge through the resistance 150. In this way, the fiber 32 can be initially deflected to an exact reading of zero on the scale 18 before the dosimeter is put into use.

As previously disclosed, the capacitance 42 becomes gradually discharged when the dosimeter is exposed to radioactivity. By reading the deflection of the fiber 32 on the scale 18, a relatively simple determination can be made of the cumulative amount of radiation to which the dosimeter has been subjected.

The apparatus disclosed above has several important advantages. The apparatus is relatively light and compact in construction. For this reason, it can be easily carried on the person of an individual for charging dosimeters or even in such a convenient place as the pocket of a man's suit. Because a minimum amount of components are included and all of the components are relatively simple, the apparatus is relatively inexpensive to produce in large quantities.

Since all of the components in the charging apparatus are readily accessible upon the removal of the side cover 102, the components can be easily assembled or replaced. For example, the battery 142 can be easily replaced by another dry cell when it becomes low. An indication that the battery should be replaced is provided by the bulb 138, which produces a weak illumination when the battery has run down.

The charging apparatus disclosed above is further advantageous in that it can be easily used. For example, a single person of limited experience or with limited instruction can readily and properly charge a dosimeter by using the charging apparatus. He has only to insert the dosimeter on the socket 132 with one hand under a moderate application of pressure and then to depress the button 112 with the other hand. At the same time, he is able to look through the lens 14 in the dosimeter to check the deflection of the fiber 32 on the scale 18.

It will be recognized that the direct voltage provided in the charging apparatus disclosed above may be furnished in other ways than with the use of the battery 142. For example, if provision is made for suitable adapters, the direct voltage available in the cigar lighter of an automobile may be utilized in the charging apparatus. This would be highly desirable should the battery 142 become run down and another battery is not readily available.

Although this invention has been disclosed with reference to particular applications, the principles involved are susceptible of numerous other applications which will be apparent to persons skilled in the art. The invention is, therefore, to be limited only as indicated by the scope of the appended claims.

I claim:

1. Apparatus for charging a capacitance in an instrument having a flexible diaphragm and a conductive portion in the diaphragm for establishing a charging circuit to the capacitance in the instrument to produce an initial deflection of a fiber to a particular position on a scale, including, a housing, a socket extending externally of the housing to receive the instrument and to establish electrical continuity with the instrument, a pin within the socket for engaging the conductive portion of the instrument diaphragm upon the positioning of the instrument on the socket and for flexing the diaphragm upon the application of pressure on the instrument to produce a continuous circuit to the instrument capacitance, a normally open switch having a movable contact positioned externally of the housing to produce a closure of the switch upon an actuation of the contact, and a circuit including the switch for charging the instrument capacitance upon a closure of the switch and upon a proper positioning of the instrument on the socket.

2. Apparatus for charging a capacitance in an instrument having a flexible diaphragm and a conductive portion in the diaphragm for establishing a charging circuit to the capacitance in the instrument to produce an initial deflection of a fiber to a particular position on a scale, including, a housing, a socket extending externally of the housing to receive the instrument and to establish electrical continuity with the instrument, a pin within the socket for engaging the conductive portion of the instrument diaphragm upon the proper positioning of the instrument on the socket and for flexing the diaphragm upon the application of pressure on the instrument to produce a continuous circuit to the instrument capacitance, means associated with the socket for producing an illumination of the instrument scale upon the proper positioning of the instrument on the socket, a normally open switch having a movable contact positioned externally of the housing to produce a closure of the switch upon an actuation of the contact, and a circuit including the switch for charging the instrument capacitance upon a closure of the switch and upon a positioning of the instrument upon the socket.

3. Apparatus for charging a capacitance in an instrument having a flexible diaphragm and a conductive portion in the diaphragm for establishing a charging circuit to the capacitance in the instrument to produce an initial deflection of a fiber, including, a housing, a socket extending from the housing to receive the dosimeter, a pin within the socket for engaging the conductive portion of the instrument diaphragm to produce a continuous circuit to the instrument capacitance upon a flexing of the diaphragm by the application of pressure on the instrument, a switch having a movable contact positioned externally of the housing, and a circuit for charging the instrument upon the closure of the switch and upon the proper positioning of the instrument upon the socket, the charging circuit including a source of direct voltage, a transformer having a primary winding connected to the voltage source and to the switch and also having a secondary winding, the circuit also including a capacitance connected to the secondary winding for charging upon the closure of the switch and for discharge into the instrument capacitance upon a proper positioning of the instrument upon the socket.

4. Apparatus for charging a capacitance in an instrument having a flexible diaphragm for establishing a charging circuit to the capacitance in the instrument to produce an initial deflection of a fiber to a particular position on a scale, including, a housing, a socket extending from the housing to receive the instrument and to flex the diaphragm upon the application of pressure on the instrument, a first normally open switch, a bulb positioned within the housing below the socket to illuminate the instrument scale upon the closure of the switch, a button disposed in lateral juxtaposition to the socket for actuation by the instrument upon the application of pressure on the instrument and for closure of the switch upon actuation, a charging circuit, and a second normally open switch having a movable contact disposed externally of the housing, the second switch being connected in the charging circuit to provide upon closure for the operation of the circuit in charging the instrument capacitance.

5. Apparatus for charging a capacitance in an instrument having a flexible diaphragm and a conductive portion in the diaphragm for establishing a charging circuit to the capacitance in the instrument to produce an initial deflection of a fiber to a particular position on a scale, including, a housing, a socket extending from the housing, a transparent filling within the socket, a pin extending through the transparent filling into the housing for establishing contact with the conductive portion in the instrument diaphragm upon a placement of the instrument upon the socket and upon the application of pressure on the instrument, a first normally open switch, a button positioned in lateral juxtaposition to the socket and associated with the switch to close the switch upon the application of pressure on the instrument, a bulb positioned below the transparent filling to illuminate the instrument scale upon the closure of the switch, a second normally open switch having a movable contact external of the housing for closure of the switch upon the actuation of the contact, and a charging circuit including the second switch for charging the instrument capacitance upon the closure of the switch and upon the positioning of the instrument upon the socket.

6. Apparatus for charging a capacitance in an instrument having a flexible diaphragm for establishing a charging circuit to the capacitance in the instrument to produce an initial deflection of a fiber, including, a housing, a direct source of voltage within the housing, a transformer within the housing and having a primary winding and a secondary winding, the primary winding of the transformer being connected to the voltage source, a capacitance within the housing and associated with the secondary winding to become charged upon a flow of current through the primary winding, a switch having a movable contact outside of the housing and associated with the last mentioned members to provide for a charge of the capacitance upon a closure of the switch, and means mounted externally of the housing to produce a flexure of the diaphragm for the establishment of a continuous circuit from the capacitance within the housing to the instrument capacitance for charging the instrument capacitance.

7. Apparatus for charging a capacitance in an instrument having a flexible diaphragm and a conductive portion in the diaphragm for establishing a charging circuit to the capacitance in the instrument to produce an initial deflection of a fiber to a particular position on a scale, including, a housing, a direct source of voltage within the housing, a transformer within the housing and having a primary winding and a secondary winding, the primary winding of the transformer being connected to the voltage source, a capacitance within the housing and associated with the secondary winding to become charged upon a flow of current through the primary winding, a first switch having a movable contact outside of the housing and associated with the last mentioned members to provide for a flow of current through the primary winding and a charge of the capacitance upon a closure of the switch, socket means mounted externally of the housing to receive the instrument and to produce a flexure of the instrument diaphragm to establish a continuous circuit from the capacitance within the housing through the conductive portion of the diaphragm to the instrument capacitance for charging the capacitance, illuminating means, and a second switch associated with the socket means and with the illuminating means to produce an illumination of the instrument scale upon a proper reception of the instrument by the socket means.

8. Apparatus for charging a dosimeter, including, a transformer having a primary winding and a secondary winding, a source of direct voltage connected to the primary winding, a switch connected between the source of direct voltage and the primary winding to provide a surge of current flow through the winding upon each closure of the switch to induce a voltage in the secondary winding, a capacitance connected to the secondary winding for becoming charged upon the production of a voltage in the secondary winding, an impedance having a relatively high back resistance connected between the secondary winding and the capacitance to prevent the capacitance from discharging through the secondary winding, and a socket connected across the capacitance for receiving a dosimeter and for charging the dosimeter upon discharge of the capacitance through the socket.

9. Apparatus for charging a dosimeter, including, a transformer having a primary winding and a secondary winding, a switch connected to the primary winding, a source of direct voltage connected between the primary winding and the switch to produce a surge of current flow through the winding upon each closure of the switch for inducing voltage pulses in the secondary winding, capacitive means connected to the secondary winding for receiving a charge upon the production of each voltage pulse in the secondary winding, impedance means having a relatively high back resistance connected between the secondary winding and the capacitive means to prevent a discharge of the capacitive means, a resistance connected to the capacitive means for providing a discharge path for the capacitive means, the resistance having a particular value to discharge the capacitive means at a relatively slow rate, and means connected to the capacitive means for receiving a dosimeter and for bypassing the resistance to charge the dosimeter by a discharge of the capacitive means.

10. Apparatus for charging a dosimeter, including, a transformer having first and second windings, a first circuit, including a source of direct voltage and a switch, connected to the first winding to produce pulses of current flow through the winding upon successive closures of the switch to induce voltage pulses in the second winding, a second circuit, including a high back resistance means and a capacitance, connected to the second winding to charge the capacitance in a first direction during the production of voltage pulses in the second winding and to prevent a discharge of the capacitance through the second winding, a socket connected to the capacitance for discharging the capacitance upon the establishment of electrical continuity in the socket, a dosimeter for positioning in the socket to establish electrical continuity in the socket to charge the dosimeter upon a discharge of the capacitance, a third circuit connected to the direct voltage source, a push button switch in the third circuit and positioned adjacent to the socket to become closed upon the positioning of the dosimeter in the socket for charging, and means in the third circuit for illuminating the interior of the dosimeter upon a closure of the push button switch.

11. Apparatus for charging a dosimeter, including, a transformer including a primary winding and a secondary winding, an impedance having a high back resistance connected to the secondary winding, a capacitance connected to the secondary winding and to the impedance, a push button switch connected to the primary winding of the transformer, a battery connected to the primary winding and to the switch for producing an instantaneous flow of current through the primary winding upon each closure of the switch to induce voltage pulses in the secondary winding for charging the capacitance, a normally open circuit connected across the capacitance, a socket in the circuit for completing the circuit to provide a discharge of the capacitance upon the positioning of the dosimeter in the socket.

References Cited in the file of this patent
UNITED STATES PATENTS

| | | |
|---|---|---|
| 2,496,886 | Molloy et al. | Feb. 7, 1950 |
| 2,628,338 | Gould | Feb. 10, 1953 |
| 2,634,374 | Shonka | Apr. 7, 1953 |
| 2,638,551 | Landsverk | May 12, 1953 |